(12) United States Patent
Kumazawa et al.

(10) Patent No.: US 7,625,635 B2
(45) Date of Patent: Dec. 1, 2009

(54) TRANSPARENT FILM-FORMING COATING LIQUID, SUBSTRATE WITH TRANSPARENT FILM, AND DISPLAY DEVICE

(75) Inventors: Mitsuaki Kumazawa, Kitakyusyu (JP); Masayuki Matsuda, Kitakyusyu (JP); Toshiharu Hirai, Kitakyusyu (JP)

(73) Assignee: JGC Catalysts and Chemicals Ltd. (JP)

( * ) Notice: Subject to any disclaimer, the term of this patent is extended or adjusted under 35 U.S.C. 154(b) by 365 days.

(21) Appl. No.: 10/556,375

(22) PCT Filed: May 12, 2004

(86) PCT No.: PCT/JP2004/006371

§ 371 (c)(1),
(2), (4) Date: Nov. 10, 2005

(87) PCT Pub. No.: WO2004/099074

PCT Pub. Date: Nov. 18, 2004

(65) Prior Publication Data

US 2006/0234087 A1      Oct. 19, 2006

(30) Foreign Application Priority Data

May 12, 2003 (JP) .............................. 2003-133591

(51) Int. Cl.
- B32B 9/00 (2006.01)
- B32B 9/04 (2006.01)
- B32B 13/04 (2006.01)
- B32B 19/00 (2006.01)
- C04B 28/26 (2006.01)
- C09D 1/00 (2006.01)

(52) U.S. Cl. ............... 428/446; 106/286.8; 106/287.34; 428/701

(58) Field of Classification Search ............. 106/286.8, 106/287.34; 428/35.7, 331, 325, 446, 701, 428/702

See application file for complete search history.

(56) References Cited

U.S. PATENT DOCUMENTS

| | | | |
|---|---|---|---|
| 6,083,314 A | 7/2000 | Nakashima et al. | |
| 6,180,030 B1 * | 1/2001 | Hirai et al. | 252/512 |
| 6,632,489 B1 | 10/2003 | Watanabe et al. | |
| 7,332,216 B2 * | 2/2008 | Hashimoto et al. | 428/331 |
| 2002/0011182 A1 * | 1/2002 | Matsuda et al. | 106/287.11 |
| 2002/0086168 A1 * | 7/2002 | Sadvary et al. | 428/447 |
| 2003/0108704 A1 * | 6/2003 | Yano et al. | 428/35.7 |
| 2006/0154048 A1 * | 7/2006 | Teranishi et al. | 428/323 |

FOREIGN PATENT DOCUMENTS

| | | |
|---|---|---|
| JP | 4-187512 A | 7/1992 |
| JP | 7-133105 A | 5/1995 |
| JP | 11-61043 A | 3/1999 |
| JP | 48277 | 2/2000 |
| JP | 2002079616 A | 3/2002 |
| JP | 2003-105268 A | 4/2003 |
| WO | 0015552 A1 | 3/2000 |
| WO | WO/2002/49982 * | 6/2002 |

* cited by examiner

*Primary Examiner*—Timothy M Speer
*Assistant Examiner*—Jonathan C Langman
(74) *Attorney, Agent, or Firm*—The Webb Law Firm

(57) ABSTRACT

A transparent film-forming coating liquid is provided which is capable of forming a transparent film that is excellent not only in scratch resistance, film hardness, scratch strength and adhesion to a substrate but also in haze and anti-glare properties. Also provided is a display device having a front panel constituted of a substrate with such a transparent film applied thereto. The transparent film-forming coating liquid comprises inorganic oxide particle groups, in each of which 2 to 10 inorganic oxide particles on an average are linked in the form of a chain, and a polar solvent. In the transparent film-forming coating liquid, the inorganic oxide particles have an average particle diameter of 4 to 200 nm. The inorganic oxide particles are silica particles, and the silica particles are porous particles and/or hollow particles each having a cavity inside.

10 Claims, No Drawings

TRANSPARENT FILM-FORMING COATING LIQUID, SUBSTRATE WITH TRANSPARENT FILM, AND DISPLAY DEVICE

TECHNICAL FIELD

The present invention relates to a coating liquid for forming a transparent film to protect a transparent substrate or a transparent conductive film provided on a surface of a substrate.

The present invention also relates to a substrate having a transparent film obtained by the use of the coating liquid, and uses of the substrate.

BACKGROUND ART

On a surface of a substrate, a protective film (hard coating film) to enhance scratch resistance, film strength, film hardness, scratch strength, pencil strength, water resistance, chemical resistance, etc. of the substrate has been heretofore formed, and various protective films have been proposed according to the type of the substrate.

Further, for the purposes of preventing static electrification of surfaces of transparent substrates, such as display panels of cathode-ray tubes, fluorescent display tubes and liquid crystal display boards, and preventing light reflection therefrom, formation of transparent films (transparent conductive films) having antistatic function and anti-reflection function on these surfaces has been carried out.

The recent substrates are desired to take scratches very rarely from the viewpoint of appearance, and therefore, the transparent films are desired to have high adhesion to the substrates and much higher film strength. However, if fine particles are used in order to improve adhesion, there is brought about a new problem that the light reflection from the surface is strengthened to cause glare of display devices, resulting in that the display image cannot be seen.

It is, therefore, an object of the present invention to provide a transparent film-forming coating liquid capable of forming a transparent film that is excellent not only in scratch resistance, film hardness, scratch strength and adhesion to a substrate but also in haze and anti-glare properties. It is another object of the present invention to provide a display device having a front panel constituted of a substrate with such a transparent film.

In order to solve such problems as mentioned above, the present inventors have earnestly studied, and as a result, they have found that by incorporating inorganic oxide particle groups, in each of which inorganic oxide particles are linked in the form of a chain, into a transparent film, the transparent film is enhanced in the scratch resistance, film hardness, scratch strength and adhesion to a substrate, and in addition, anti-glare properties of the film can be enhanced without deterioration of haze. Based on the finding, the present invention has been accomplished.

SUMMARY OF THE INVENTION

The transparent film-forming coating liquid according to the present invention comprises inorganic oxide particle groups, in each of which 2 to 10 inorganic oxide particles on an average are linked in the form of a chain, and a polar solvent.

The inorganic oxide particles preferably have an average particle diameter of 4 to 200 nm.

The inorganic oxide particles are preferably silica particles.

The silica particles are preferably porous particles and/or hollow particles each having a cavity inside.

The substrate with a transparent film according to the present invention comprises a substrate and a transparent film provided on the substrate, said transparent film being formed by the use of the above-mentioned transparent film-forming coating liquid.

In the substrate with a transparent film, a transparent conductive fine particle layer comprising conductive fine particles having an average particle diameter of 1 to 200 nm is preferably provided between the substrate and the transparent film.

The display device according to the present invention is a display device having a front panel constituted of the above-mentioned substrate with a transparent film, wherein the transparent film is formed on the other surface of the front panel.

The transparent film-forming coating liquid of the invention contains inorganic oxide particle groups, and therefore, a transparent film that is excellent not only in scratch resistance, scratch strength, pencil hardness and adhesion to a substrate but also in haze and anti-glare properties can be formed.

By the use of the coating liquid, a substrate with a transparent film that is excellent not only in scratch resistance, scratch strength, pencil hardness and adhesion to a substrate but also in haze and anti-glare properties can be obtained.

By providing a transparent conductive fine particle layer between the substrate and the transparent film, it becomes feasible to obtain a substrate with a transparent film having excellent antistatic properties and excellent electromagnetic wave shielding properties, and moreover, a display device which rarely takes scratches on the surface, a reflected light from which is efficiently inhibited and which exhibits excellent anti-glare properties can be obtained.

DETAILED DESCRIPTION OF THE INVENTION

Transparent Film-Forming Coating Liquid

First, the transparent film-forming coating liquid of the invention is described.

The transparent film-forming coating liquid of the invention comprises inorganic oxide particle groups, in each of which 2 to 10 inorganic oxide particles on an average are linked in the form of a chain, a matrix-forming component and a polar solvent. (In the transparent film-forming coating liquid of the invention, conductive fine particles are not contained.)

Inorganic Oxide Particle Groups

The inorganic oxide particle groups for use in the invention are groups in each of which 2 to 10 inorganic oxide particles on an average are linked in the form of a chain.

Examples of the inorganic oxide particles employable in the invention include particles of silica, silica-alumina, titania, zirconia and antimony oxide. The average particle diameter of the inorganic oxide particles is in the range of preferably 4 to 200 nm, more preferably 4 to 100 nm.

When the average particle diameter is in the above range, desired inorganic oxide particle groups can be obtained, and further, a transparent film having excellent scratch resistance, scratch strength, pencil hardness and adhesion to a substrate and having enhanced anti-glare properties can be formed. It is difficult to obtain particles having an average particle diameter of less than the lower limit of the above range, and even if such particles are obtained, it is difficult to form an inorganic oxide particle group in the form of a chain, so that the above-mentioned excellent effects cannot be exerted. In case of inorganic oxide particles having an average particle diameter of more than the upper limit of the above range, anti-glare properties are enhanced, but haze of a transparent film or a transparent conductive film tends to be deteriorated.

The inorganic oxide particles are preferably silica particles. In case of the silica particles, an inorganic oxide particle group in the form of a chain is easily obtained, and the refractive index of the resulting transparent film can be lowered. Therefore, a substrate provided with the transparent film exhibits excellent anti-reflection properties.

The silica particles are particularly preferably porous particles and/or hollow particles each having a cavity inside.

When the silica particles are porous particles and/or hollow particles each having a cavity inside, such particles have a refractive index lower than the refractive index (1.45) of silica, and by incorporating such particles into the transparent film, the refractive index of the transparent film can be lowered. As a result, a substrate with a transparent film or a substrate with a transparent conductive film having excellent anti-reflection properties can be obtained.

Especially in case of the hollow particles each having a cavity inside, a transparent film having a haze superior to a haze of a transparent film using particles having no cavity inside can be obtained, so that such hollow particles are favorably employed.

For preparing the hollow particles each having a cavity inside, processes disclosed in Japanese Patent Laid-Open Publication No. 133105/1995 and Japanese Patent Laid-Open Publication No. 48277/2000 filed by the present applicant can be favorably adopted.

The process for preparing the inorganic oxide particle groups is, for example, a process comprising adjusting concentration or pH of a monodisperse inorganic oxide particle dispersion and subjecting the dispersion to hydrothermal treatment at high temperatures such as a temperature of not lower than 100° C. Through this process, particle groups in each of which particles are linked can be obtained. In this case, a binder component may be added to accelerate linking of the particles, when needed. A process for preparing short fibrous silica disclosed in Japanese Patent Laid-Open Publication No. 61043/1999 filed by the present applicant can be also favorably adopted.

The inorganic oxide particle groups obtained by the conventional process can be used after they are classified, when needed.

When the chain inorganic oxide particle groups are contained as in the present invention, a transparent film having excellent scratch resistance, scratch strength and pencil strength can be formed as previously described. Although the reason is not clear, it is considered that the particle groups are entangled in one another to absorb a stress applied to the transparent film.

It is also considered that when the chain inorganic oxide particle groups are contained, fine irregularities are formed on a surface of a transparent film in the formation of the transparent film to scatter a reflected light, and hence, the resulting transparent film exhibits excellent anti-glare properties.

Matrix-Forming Component

Examples of the matrix-forming components include inorganic oxides, such as silica, titania, zirconia and antimony oxide, and composite oxides thereof.

In the present invention, the matrix-forming component is preferably a hydrolysis polycondensation product of a hydrolyzable organosilicon compound or a silicic acid solution obtained by dealkalizing an alkali metal silicate aqueous solution, and particularly, the matrix-forming component preferably contains a hydrolysis polycondensation product of alkoxysilane represented by the following formula [1]. When silica film contains such a matrix-forming component, the inorganic oxide particles can be effectively linked in the form of a chain, and the resulting transparent film rarely suffers cracking and exhibits excellent scratch resistance, film strength and scratch strength.

$$R_a Si(OR')_{4-a} \quad [1]$$

In the formula [1], R is a vinyl group, an aryl group, an acrylic group, an alkyl group of 1 to 8 carbon atoms, a hydrogen atom or a halogen atom, R' is a vinyl, group, an aryl group, an acrylic group, an alkyl group of 1 to 8 carbon atoms, $—C_2H_4OC_nH_{2n+1}$ (n is 1 to 4) or a hydrogen atom, and a is an integer of 0 to 3.

Examples of such alkoxysilanes include tetramethoxysilane, tetraethoxysilane, tetraisopropoxysilane, tetrabutoxysilane, tetraoctoxysilane, methyltrimethoxysilane, methyltriethoxysilane, ethyltriethoxysilane, methyltriisopropoxysilane, vinyltrimethoxysilane, phenyltrimethoxysilane and dimethyldimethoxysilane.

By hydrolyzing one or more of the above alkoxysilanes in, for example, a water/alcohol mixed solvent in the presence of an acid catalyst, a transparent film-forming coating liquid containing a hydrolysis polycondensation product of alkoxysilane is obtained. The concentration of the matrix-forming component contained in the coating liquid is preferably in the range of 0.5 to 2.0% by weight, in terms of solids content.

Polar Solvent

Examples of the polar solvents for use in the invention include water; alcohols, such as methanol, ethanol, propanol, butanol, diacetone alcohol, furfuryl alcohol, tetrahydrofurfuryl alcohol, ethylene glycol and hexylene alcohol; esters, such as methyl acetate and ethyl acetate; ethers, such as diethyl ether, ethylene glycol monomethyl ether, ethylene glycol monoethyl ether, ethylene glycol monobutyl ether, diethylene glycol monomethyl ether and diethylene glycol monoethyl ether; and ketones, such as acetone, methyl ethyl ketone, acetylacetone and acetoacetic acid ester. These solvents may be used singly or as a mixture of two or more kinds.

In the transparent film-forming coating liquid, the inorganic oxide particle groups are desirably contained in amounts of 0.05 to 5% by weight, preferably 0.1 to 2% by weight, in terms of solids content. When the amount of the inorganic oxide particle groups is in the above range, a desired transparent film can be formed. If the amount of the inorganic oxide particle groups is less than the lower limit of the above range, scratch resistance, scratch strength, pencil hardness, anti-glare properties, etc. become insufficient because the amount thereof is too small. If the amount thereof exceeds the upper limit of the above range, the proportion of the matrix-forming component is lowered, and the transparent film itself becomes porous, so that scratch resistance, scratch strength, pencil hardness anti-glare properties, adhesion to a substrate, etc. become insufficient.

In the transparent film-forming coating liquid for use in the invention, fine particles of low-refractive index materials such as magnesium fluoride and/or additives such as dyes or pigments may be contained.

In the transparent film-forming coating liquid for use in the invention, the solids concentration of the total of the inorganic oxide particle groups, the matrix-forming component, and the optionally used low-refractive index materials, conductive fine particles, dyes, pigments, etc. is in the range of preferably 1 to 10% by weight, more preferably 1.1 to 7% by weight.

Substrate with Transparent Film

The substrate with a transparent film according to the invention comprises a substrate and a transparent film provided on the substrate, and the transparent film is formed by the use of the above-described transparent film-forming coating liquid.

Examples of the substrates employable in the invention include glasses, and films, sheets or other molded products made of plastics, such as polyethylene terephthalate, triacetyl cellulose and acrylic resin, or ceramics.

Formation of Transparent Film

For forming a transparent film, the transparent film-forming coating liquid is applied onto a substrate (or a transparent conductive fine particle layer described later if the layer is provided), then dried and cured.

The film formed by applying the transparent film-forming coating liquid may be heated at a temperature of not lower than 100° C. during drying or after drying, or the uncured film may be irradiated with electromagnetic waves having shorter wavelength than visible light, such as ultraviolet rays, electron rays, X rays or γ rays, or the film may be exposed to an atmosphere of an active gas such as ammonia. By performing such treatments, curing of the film-forming component is accelerated, and the hardness of the resulting transparent film is increased.

The resulting transparent film has a film thickness of preferably 50 to 300 nm, more preferably 80 to 200 nm. When the film thickness is in this range, excellent anti-reflection properties are exhibited. The method to form the transparent film is not specifically restricted, and various wet thin film forming methods, such as dipping, spinner method, roll coater method and flexo printing, are adoptable.

It is also possible to form a conductive film (conductive fine particle layer) on the surface of the substrate and to form the transparent film on the surface of the fine particle layer. The conductive film is formed from a coating liquid containing conductive fine particles.

Conductive Fine Particle Layer

Conductive Fine Particles

The conductive fine particles for use in the invention are preferably metal fine particles made of one or more metals selected from metals, such as Au, Ag, Pd, Pt, Rh, Ru, Cu, Fe, Ni, Co, Sn, Ti, In, Al Ta and Sb.

Examples of the metal fine particles made of two or more metals include Au—Cu, Ag—Pt, Ag—Pd, Au—Pd, Au—Rh, Pt—Pd, Pt—Rh, Fe—Ni, Ni—Pd, Fe—Co, Cu—Co, Ru—Ag, Au—Cu—Ag, Ag—Cu—Pt, Ag—Cu—Pd, Ag—Au—Pd, Au—Rh—Pd, Ag—Pt—Pd, Ag—Pt—Rh, Fe—Ni—Pd, Fe—Co—Pd and Cu—Co—Pd.

The two or more metals may be an alloy in a state of solid solution, or may be a eutectic crystal that is not in a state of solid solution, or an alloy and a eutectic crystal may be present together.

In case of such composite metal fine particles, oxidation or ionization of metals is inhibited. Therefore, particle growth of the composite metal fine particles is inhibited, and the composite metal fine particles have excellent reliability, such as high corrosion resistance and small decrease in conductivity and light transmittance.

The conductive metal fine particles desirably have an average particle diameter of 1 to 200 nm, preferably 2 to 70 nm. When the average particle diameter of the conductive fine particles is in this range, light absorption by metals is small. Therefore, even if the fine particle layer is provided, the light transmittance is high and the haze becomes low. Accordingly, formation of a transparent conductive fine particle layer becomes feasible.

If the average particle diameter of the conductive fine particles exceeds the upper limit of the above range, light absorption by metals becomes great, and with decrease of the light transmittance of the particle layer, the haze is increased. Therefore, if the resulting substrate with a film is used as a front panel of a cathode-ray tube, resolution of a display image is sometimes lowered. If the average particle diameter of the conductive fine particles is less than the lower limit of the above range, surface resistance of the particle layer is abruptly increased, and therefore, a film having a resistance value of such a low level as capable of attaining the objects of the invention cannot be obtained occasionally.

The conductive fine particles can be obtained by the following publicly known process, but the process employable is not limited thereto.

For example, the conductive fine particles can be obtained by reducing a salt of one or more of the aforesaid metals in an alcohol/water mixed solvent. In this case, a reducing agent may be added when needed. Examples of the reducing agents include ferrous sulfate, trisodium citrate, tartaric acid, sodium boron hydride and sodium hypophosphite. Further, heat treatment at a temperature of not lower than about 100° C. may be carried out in a pressure vessel.

In order to form the conductive fine particle layer for use in the invention, a conductive film-forming coating liquid comprising the aforesaid conductive fine particles and the aforesaid polar solvent is usually used as a coating liquid.

In the conductive fine particle layer-forming coating liquid, the metal fine particles are desirably contained in amounts of 0.05 to 5% by weight, preferably 0.1 to 2% by weight.

In the conductive fine particle layer-forming coating liquid, conductive fine particles other than the metal fine particles may be contained.

Examples of the conductive fine particles employable in the invention include conductive inorganic oxide fine particles publicly known and fine particle carbon.

Examples of the conductive inorganic oxide fine particles include tin oxide, tin oxide doped with Sb, F or P, indium oxide, indium oxide doped with Sn or F, antimony oxide and lower titanium oxide. These conductive inorganic oxide fine particles desirably have an average particle diameter of 1 to 200 nm, preferably 2 to 150 nm.

The conductive inorganic oxide fine particles have only to be contained in amounts of not more than 0.4 part by weight based on 1 part by weight of the aforesaid metal fine particles. The conductive inorganic oxide fine particles have higher transparency than the metal fine particles, and therefore, by incorporating them, a transparent conductive fine particle layer having higher transparency can be formed. By incorporating the conductive fine particles, further, a conductive film can be formed more inexpensively as compared with a film made of a metal only.

To the conductive fine particle layer-forming coating liquid, dyes and pigments may be added so that the visible light transmittance may become constant in a wide wavelength region of visible light.

The solids concentration (total amount of the metal fine particles and the optionally added additives such as conductive fine particles other than the metal fine particles, dyes and pigments) of the conductive fine particle layer-forming coating liquid for use in the invention is desired to be not more than 15% by weight, preferably 0.15 to 5% by weight, from the viewpoints of flowability of the liquid and dispersibility of the particulate components.

In the conductive fine particle layer-forming coating liquid for use in the invention, a matrix component functioning as a binder for the conductive fine particles after film formation may be contained.

As the matrix component, a component comprising silica is preferable. More specifically, a hydrolysis polycondensation product of an organosilicon compound such as alkoxysilane or a silicic acid polycondensation product obtained by dealkalizing an alkali metal silicate aqueous solution is employable. A coating resin is also employable. The matrix has only to be contained in an amount of 0.01 to 0.5 part by weight, preferably 0.03 to 0.3 part by weight, based on 1 part by weight of the metal fine particles (or 1 part by weight of the total of the metal fine particles and the conductive fine particles if the conductive fine particles are contained). In the conductive fine particle layer-forming coating liquid, the matrix component is desirably contained in an amount of 0.01 to 2% by weight, preferably 0.1 to 1% by weight.

In order to enhance dispersibility of the metal fine particles, an organic stabilizer may be contained in the transparent conductive fine particle layer-forming coating liquid. Examples of the organic stabilizers include gelatin, polyvinyl alcohol, polyvinyl pyrrolidone, polycarboxylic acids, such as oxalic acid, malonic acid, succinic acid, glutaric acid, adipic acid, sebacic acid, maleic acid, fumaric acid, phthalic acid and citric acid, salts of the polycarboxylic acids, and mixtures of the these compounds.

The organic stabilizer has only to be contained in an amount of 0.005 to 0.5 part by weight, preferably 0.01 to 0.2 part by weight, based on 1 part by weight of the metal fine particles. When the organic stabilizer is contained in an amount of this range, dispersibility can be enhanced, and moreover, conductivity is not inhibited. If the amount of the organic stabilizer is too small, sufficient dispersibility cannot be obtained. If the amount thereof is too large, conductivity is sometimes inhibited.

Formation of Conductive Fine Particle Layer

The process for forming a conductive fine particle layer is, for example, a process comprising applying the conductive fine particle layer-forming coating liquid onto a substrate by dipping, spinner method, spraying, roll coater method, flexo printing or the like and drying it at a temperature of room temperature to about 90° C.

In the case where the matrix-forming component is contained in the conductive fine particle layer-forming coating liquid, curing treatment of the matrix-forming component may be carried out.

For the curing treatment, the following methods are available.

(a) Thermal Curing

The coating film after drying is heated to a temperature of not lower than 100° C. to cure the matrix component.

(b) Electromagnetic Wave Curing

After the coating stage or the drying stage or during the drying stage, the coating film is irradiated with electromagnetic waves having a shorter wavelength than visible light to cure the matrix component.

(c) Gas Curing

After the coating stage or the drying stage or during the drying stage, the coating film is exposed to an atmosphere of a gas that accelerates curing reaction of the matrix component, such as ammonia, to cure the matrix component.

The thickness of the conductive fine particle layer is preferably in the range of about 50 to 200 nm. When the thickness is in this range, a substrate with a film having excellent electromagnetic shielding effect can be obtained.

When the conductive fine particle layer is provided, a hard coating film may be formed between the substrate and the conductive fine particle layer.

The hard coating film can be formed by applying a coating liquid containing a matrix-forming component for forming a hard coating film and if necessary inorganic fine particles, such as particles of silica, zirconia or antimony oxide, onto a substrate by a roll coater method, a spinner method or the like, followed by drying and if necessary heating.

As the matrix-forming component for forming a hard coating film, a resin matrix is usually used. Examples of the resin matrixes include coating resins, such as a thermosetting silicone resin, an ultraviolet curing silicone resin, a thermosetting acrylic resin, and an ultraviolet curing acrylic resin. The hard coating film desirably has a thickness of usually 1 to 20 nm.

Display Device

The display device according to the invention has a front panel constituted of the substrate with a transparent film, and the transparent film is formed on the surface of the front panel.

Of the substrates with a transparent film according to the invention, a substrate with a transparent film, in which a transparent conductive fine particle layer is provided between the substrate and the transparent film and which has surface resistance of about $10^2$ to $10^{13} \Omega/\square$ that is necessary for anti-reflection function and electromagnetic shielding function, can be favorably used as a front panel of a display device because it has sufficient anti-reflection properties in the visible region and the near infrared region.

The display device according to the invention is a device for electrically display an image, such as a cathode-ray tube (CRT), a fluorescent display tube (FIP), a plasma display (PDP) or a liquid crystal display (LCD), and has a front panel constituted of a substrate with such a transparent film comprising inorganic oxide particle groups as described above. By virtue of such a transparent film, the front panel has excellent scratch resistance, scratch strength, pencil hardness and adhesion to a substrate. Accordingly, the surface of the substrate does not take scratches easily, and the display image does not become hard to see. If a reflected light occurs on a front panel of a display device, the display image usually becomes hard to see because of the reflected light, but in the case where groups of silica particles having a low refractive index are used as the inorganic oxide particle groups, the reflected light can be effectively inhibited.

EXAMPLES

The present invention is further described with reference to the following examples, but it should be construed that the invention is in no way limited to those examples.

Example 1

Preparation of Silica Particle (A) Dispersion

To 2000 g of a silica sol (SI-550, available from Catalysts & Chemicals Industries Co., Ltd., average particle diameter: 5 nm, $SiO_2$ concentration: 20% by weight, Na in silica: 2700 ppm), 6000 g of ion-exchanged water was added, then 400 g of a cation-exchange resin (SK-1BH, available from Mitsubishi Chemical Corporation) was added, and they were stirred for 1 hour to perform dealkalization.

Subsequently, the cation-exchange resin was separated, then 400 g of an anion-exchange resin (SANUPC, available from Mitsubishi Chemical Corporation) was added to the dispersion, and they were stirred for 1 hour to perform deanionization. Thereafter, 400 g of a cation-exchange resin (SK-1BH, available from Mitsubishi Chemical Corporation) was added again to the dispersion, and they were stirred for 1 hour to perform dealkalization, whereby a silica particle (RA) dispersion having a $SiO_2$ concentration of 5% by weight was prepared. The Na content in the silica particles was 200 ppm.

Then, the dispersion was adjusted to pH 4.0 by the use of a dilute hydrochloric acid and treated in an autoclave at 200° C. for 1 hour. Then, a cation-exchange resin was added to the dispersion at room temperature, and they were stirred for 1 hour to perform dealkalization.

After the cation-exchange resin was separated, an anion-exchange resin was added to the dispersion, and they were stirred for 1 hour to perform deanionization, whereby a silica particle group (A) dispersion having a $SiO_2$ concentration of 5% by weight was prepared. The silica particle groups were chain silica particle groups in each of which about 3 to 5 silica particles were linked (average number of linked particles: 3, length: 15 nm), and the Na content in the silica particles was 30 ppm.

Preparation of Transparent Film-Forming Coating Liquid (A)

A mixed solution of 50 g of normal ethyl silicate ($SiO_2$: 28% by weight), 194.6 g of ethanol, 1.4 g of concentrated nitric acid and 34 g of pure water was stirred for 5 hours at room temperature to prepare a liquid containing a transparent film-forming component ($SiO_2$ concentration: 5% by weight).

The resulting liquid was mixed with 56 g of the silica particle (A) dispersion having $SiO_2$ concentration of 5% by weight, and then, to the mixture was added a mixed solvent of ethanol/butanol/diacetone alcohol/isopropanol (mixing ratio of 2:1:1:5 by weight) to prepare a transparent film-forming coating liquid (A) having a $SiO_2$ concentration of 1% by weight.

Preparation of Substrate (A) with Transparent Film

With maintaining a surface of a panel glass (14" (inch)) for a cathode-ray tube at 40° C., the transparent film-forming coating liquid (A) was applied to the surface by a spinner method under the conditions of 100 rpm and 90 seconds, then dried and baked at 160° C. for 30 minutes to obtain a substrate (A) with a transparent film. The film thickness of the transparent film was 120 nm.

The haze of the substrate (A) with a transparent film was measured by a haze computer (3000A, manufactured by Nippon Denshoku Industries, Ltd.). The reflectance was measured by the use of a reflectance meter (MCPD-2000, manufactured by Otsuka Electronics Co., Ltd.). A reflectance at the wavelength at which the reflectance was lowest in the wavelength region of 400 to 700 nm was expressed as a bottom reflectance, and an average of the reflectance values in the wavelength region of 400 to 700 nm was expressed as a luminous reflectance.

Further, scratch strength, pencil hardness and adhesion were measured by the following methods and evaluated based on the following criteria. The results are set forth in Table 1.

Measurement of Scratch Strength

On an anti-reflection film of the substrate (A) with an anti-reflection film, a standard test needle (manufactured by Rockwell Co., Ltd., hardness: HRC-60, ϕ (diameter): 0.5 mm) was set, and under application of a load of 1±0.3 kg, the needle was swept over the anti-reflection film at a stroke of 30 to 40 mm. After the sweeping, the film surface was observed at a distance of 45 cm from the surface under illumination of 1000 lx.

A: A scratch mark is not observed at all.
B: A linear scratch mark is intermittently observed.
C: A shallow continuous linear scratch mark is observed.
D: A continuous linear scratch mark is clearly observed.

Measurement of Pencil Hardness

The pencil hardness was measured in accordance with JIS-K-5300.

Measurement of Adhesion

On a surface of the substrate (A) with a transparent film, 11 parallel lines were made with a knife longitudinally and horizontally at intervals of 1 mm to form 100 squares. Onto the surface, a cellophane Tape™ was stuck, and then the cellophane tape was peeled off. After the cellophane tape was peeled off, the number of squares where the film was not peeled off and remained was counted. The result is set forth in Table 1.

Evaluation of Anti-Glare Properties

The gloss of a transparent film surface of the substrate (A) with a transparent film was measured by means of a glossmeter (PG-1, manufactured by Nippon Denshoku Industries, Ltd.). A substrate having a lower gloss has higher anti-reflection properties.

Example 2

Preparation of Transparent Film-Forming Coating Liquid (B)

50 g of a liquid containing a transparent film-forming component ($SiO_2$ concentration: 5% by weight) was prepared in the same manner as in Example 1. The resulting liquid was mixed with 30 g of a silica particle (A) dispersion having a $SiO_2$ concentration of 5% by weight obtained in the same manner as in Example 1, and then, to the mixture was added a mixed solvent of ethanol/butanol/diacetone alcohol/isopropanol (mixing ratio of 2:1:1:5 by weight) to prepare a transparent film-forming coating liquid (B) having a $SiO_2$ concentration of 1% by weight.

Preparation of Substrate (B) with Transparent Film

A substrate (B) with a transparent film was obtained in the same manner as in Example 1, except that the transparent film-forming coating liquid (B) was used.

The resulting substrate (B) with a transparent film was measured on haze, anti-glare properties, bottom reflectance, luminous reflectance, scratch strength, pencil hardness and adhesion. The results are set forth in Table 1.

Example 3

Preparation of Hard Coating Film-Forming Coating Liquid (CH)

A silicone-based ultraviolet curing resin (Colcoat P, available from Colcoat Co., Ltd.) was diluted with a mixed solvent of 2-propanol/methyl acetate/methyl ethyl ketone (mixing ratio of 1:1:1 by weight) to a concentration of 30% by weight to prepare a hard coating film-forming coating liquid (CH).

Preparation of Transparent Film-Forming Coating Liquid (C)

50 g of a liquid containing a transparent film-forming component ($SiO_2$ concentration: 5% by weight) was prepared in the same manner as in Example 1. The resulting liquid was mixed with 30 g of a silica particle (A) dispersion having a $SiO_2$ concentration of 5% by weight obtained in the same manner as in Example 1, and then, to the mixture was added a mixed solvent of ethanol/butanol/diacetone alcohol/isopropanol (mixing ratio of 2:1:1:5 by weight) to prepare a transparent film-forming coating liquid (C) having a $SiO_2$ concentration of 2.5% by weight.

Preparation of Substrate (C) with Transparent Film

The hard coating film-forming coating liquid (CH) was applied onto a resin film (triacetyl cellulose (TAC) film, thickness: 0.8 mm) by a roll coater method and dried at 120° C. for 120 seconds. The film thickness of the resulting hard coating film was 5 □m.

Subsequently, the transparent film-forming coating liquid (C) was applied by a spinner method under the conditions of 100 rpm and 90 seconds and then dried at 120° C. for 120 seconds to obtain a substrate (C) with a transparent film. The film thickness of the transparent film was 120 nm.

The resulting substrate (C) with a transparent film was measured on haze, anti-glare properties, bottom reflectance, luminous reflectance, scratch strength, pencil hardness and adhesion. The results are set forth in Table 1.

Example 4

Preparation of Silica Particle (B) Dispersion

The dispersion of Example 1 was adjusted to pH 3.0 by the use of a dilute hydrochloric acid and treated in an autoclave at 200° C. for 1 hour.

Subsequently, a cation-exchange resin was added to the dispersion at room temperature, and they were stirred for 1 hour to perform dealkalization. After the cation-exchange resin was separated, an anion-exchange resin was added to the dispersion, and they were stirred for 1 hour to perform deanionization, whereby a silica particle (B) dispersion having a $SiO_2$ concentration of 5% by weight was prepared.

As for the silica particles, about 4 to 8 silica particles were linked (average number of linked particles: 6, length: 30 nm), and the Na content in the silica particles was 30 ppm.

Preparation of Transparent Film-Forming Coating Liquid (D)

50 g of a liquid containing a transparent film-forming component ($SiO_2$ concentration: 5% by weight) was prepared in the same manner as in Example 1. The resulting liquid was mixed with 30 g of the silica particle (B) dispersion having a $SiO_2$ concentration of 5% by weight, and then, to the mixture was added a mixed solvent of ethanol/butanol/diacetone alcohol/isopropanol (mixing ratio of 2:1:1:5 by weight) to prepare a transparent film-forming coating liquid (D) having a $SiO_2$ concentration of 2.5% by weight.

Preparation of Substrate (D) with Transparent Film

A substrate (D) with a transparent film was obtained in the same manner as in Example 3, except that the transparent film-forming coating liquid (D) was used.

The resulting substrate (D) with a transparent film was measured on haze, anti-glare properties, bottom reflectance, luminous reflectance, scratch strength, pencil hardness and adhesion. The results are set forth in Table 1.

Example 5

Preparation of Metal Fine Particle (E) Dispersion

To 100 g of pure water, trisodium citrate was added in such an amount that the amount of the trisodium citrate became 0.01 part by weight based on 1 part by weight of the resulting metal fine particles. To the mixture, a silver nitrate aqueous solution and a palladium nitrate aqueous solution were added in such amounts that the total metal concentration became 10% by weight and the Ag/Pd ratio by weight became 8/2. Then, the same number of moles of an aqueous solution of ferrous sulfate as the total number of moles of silver nitrate and palladium nitrate was further added.

The resulting mixture was stirred for 1 hour in a nitrogen atmosphere to obtain a dispersion of composite metal particles. The resulting dispersion was washed with water by means of a centrifugal separator to remove impurities and then dispersed in water to prepare a metal fine particle (E) dispersion. The average particle diameter of the metal fine particles was 8 nm, and the concentration was 10% by weight.

Preparation of Conductive Fine Particle Layer-Forming Coating Liquid (E)

20 g of the metal fine particle (E) dispersion was mixed with 480 g of a mixed organic solvent of ethanol/butanol/diacetone alcohol/isopropanol (mixing ratio of 2:1:1:5 by weight) to prepare a conductive fine particle layer-forming coating liquid (E) having a solids concentration of 0.4% by weight.

Preparation of Substrate (E) with Transparent Film

With maintaining a surface of a panel glass (14") for a cathode-ray tube at 40° C., the transparent conductive fine particle layer-forming coating liquid (E) was applied to the surface by a spinner method under the conditions of 150 rpm and 90 seconds and then dried to form a conductive fine particle layer.

Subsequently, onto the conductive fine particle layer, a transparent film-forming coating liquid (A) obtained in the same manner as in Example 1 was applied by a spinner method under the conditions of 150 rpm and 90 seconds similarly to the above, then dried and baked at 160° C. for 30 minutes to obtain a substrate (E) with a transparent film.

The resulting substrate (E) with a transparent film was measured on surface resistance by a surface resistance meter (LORESTA, manufactured by Mitsubishi Petrochemical Co., Ltd.), and further measured on haze, anti-glare properties, bottom reflectance, luminous reflectance, scratch strength, pencil hardness and adhesion. The results are set forth in Table 1.

Example 6

Preparation of Substrate (F) with Transparent Film

With maintaining a surface of a panel glass (14") for a cathode-ray tube at 40° C., a conductive fine particle layer-forming coating liquid (E) obtained in the same manner as in Example 5 was applied to the surface by a spinner method under the conditions of 100 rpm and 90 seconds and then dried to form a conductive fine particle layer.

Subsequently, onto the conductive fine particle layer, a transparent film-forming coating liquid (B) obtained in the same manner as in Example 2 was applied by a spinner method under the conditions of 100 rpm and 90 seconds similarly to the above, then dried and baked at 160° C. for 30 minutes to obtain a substrate (F) with a transparent film.

The resulting substrate (F) with a transparent film was measured on surface resistance, haze, anti-glare properties, bottom reflectance, luminous reflectance, adhesion and film thickness. The results are set forth in Table 1.

Example 7

Preparation of Conductive Fine Particle Layer-Forming Coating Liquid (G)

To a mixed solvent of isopropyl alcohol/butyl cellosolve (mixing ratio of 8/2 by weight), 2.5 g of a Sn-doped indium oxide fine particle dispersion (IME-25, available from Catalysts & Chemical Industries Co., Ltd., average particle diameter: 20 nm, solids concentration: 20.5% by weight) was added, and the resulting dispersion was mixed with a silicone-based ultraviolet curing resin (Colcoat P, available from Colcoat Co., Ltd.) to obtain a transparent conductive fine particle layer-forming coating liquid (G).

Preparation of Substrate (G) with Transparent Film

The hard coating film-forming coating solution (CH) was applied onto a resin film (triacetyl cellulose (TAC) resin film, thickness: 0.8 mm) by a roll coater method similarly to Example 3, then dried at 120° C. for 60 seconds and irradiated with ultraviolet rays (600 mJ/cm$^2$). The film thickness of the resulting hard coating film was 5 □m.

Subsequently, the conductive fine particle layer-forming coating liquid (G) was applied to a surface of the hard coating film, then dried at 120° C. for 60 seconds and irradiated with ultraviolet rays (600 mJ/cm$^2$). The thickness of the resulting conductive fine particle layer was 120 nm.

Then, a transparent film-forming coating liquid (C) obtained in the same manner as in Example 3 was further applied onto the conductive fine particle layer by a spinner method under the conditions of 100 rpm and 90 seconds and then dried at 120° C. for 120 seconds to obtain a substrate (G) with a transparent film. The film thickness of the transparent film was 120 nm.

The resulting substrate (G) with a transparent film was measured on haze, anti-glare properties, bottom reflectance, luminous reflectance, scratch strength, pencil hardness and adhesion. The results are set forth in Table 1.

Example 8

Preparation of Silica-Alumina Particle (C) Dispersion

A mixture of 100 g of a silica sol having an average particle diameter of 5 nm and a $SiO_2$ concentration of 20% by weight and 1,900 g of pure water was heated to 80° C. The pH of this mother liquor was 10.5. To the mother liquor, 9,000 g of a sodium silicate aqueous solution having a concentration of 1.17% by weight as $SiO_2$ and 9,000 g of a sodium aluminate aqueous solution having a concentration of 0.83% by weight as $Al_2O_3$ were added at the same time.

During the addition, the temperature of the reaction liquid was maintained at 80° C. Immediately after the addition, the pH of the reaction liquid rose to 12.5, and thereafter, the pH rarely changed. After the addition was completed, the reaction liquid was cooled to room temperature and washed by means of an ultrafiltration membrane to prepare a $SiO_2.Al_2O_3$ primary particle dispersion having a solids concentration of 20% by weight.

To 500 g of the primary particle dispersion, 1,700 g of pure water was added, and they were heated to 98° C. With maintaining this temperature, 50,400 g of sodium sulfate having a concentration of 0.5% by weight was added, and then 3,000 g of a sodium silicate aqueous solution having a concentration of 1.17% by weight as $SiO_2$ and 9,000 g of a sodium aluminate aqueous solution having a concentration of 0.5% by weight as $Al_2O_3$ were added to obtain a dispersion of composite oxide fine particles (1).

The resulting dispersion was washed by means of an ultrafiltration membrane to obtain a dispersion of composite oxide fine particles (1) having a solids concentration of 13% by weight. To 500 g of this dispersion of composite oxide fine particles (1), 1,125 g of pure water was added, and concentrated hydrochloric acid (concentration: 35.5% by weight) was further dropwise added to adjust the dispersion to pH 1.0 and to perform dealuminization.

Then, with adding 10 liters of a hydrochloric acid aqueous solution of pH 3 and 5 liters of pure water, the dissolved aluminum salt was separated by means of an ultrafiltration membrane to prepare a composite oxide fine particle (P-1) water dispersion having a solids concentration of 20% by weight.

A mixture of 1,500 g of the composite oxide fine particle (P-1) water dispersion, 500 g of pure water, 1,750 g of ethanol and 626 g of 28% aqueous ammonia was heated to 35° C., and then 104 g of ethyl silicate ($SiO_2$: 28% by weight) was added.

Subsequently, the dispersion medium was replaced with water by means of an ultrafiltration membrane to prepare a silica-alumina particle (RC) dispersion having a $SiO_2.Al_2O_3$ concentration of 5% by weight. The average particle diameter of the silica-alumina particles (RC) was 40 nm.

The silica-alumina particle (RC) dispersion was adjusted to pH 4.0 by the use of a dilute hydrochloric acid and then treated in an autoclave at 200° C. for 1 hour.

Subsequently, to the dispersion was added a cation-exchange resin at room temperature, and they were stirred for 1 hour to perform dealkalization. After the cation-exchange resin was separated, an anion-exchange resin was added to the dispersion, and they were stirred for 1 hour to perform deanionization, whereby a silica-alumina particle (C) dispersion having a $SiO_2.Al_2O_3$ concentration of 5% by weight was prepared.

As for the silica-alumina particles, about 3 to 5 particles were linked (average number of linked particles: 3, length: 20 nm), and the Na content in the silica-alumina particles was 50 ppm.

The $Al_2O_3/SiO_2$ ratio (by mol) of the silica-alumina particles (C) was 0.0019, and the refractive index thereof was 1.28. The silica-alumina particles were observed by TEM, and as a result, they proved to be hollow particles each having a cavity inside.

The refractive index was measured in the following manner using CARGILL Series A, AA as standard refractive index solutions.

Measurement of Refractive Index of Particles (1) A composite oxide dispersion is withdrawn into an evaporator, and a dispersion medium was evaporated.

(2) The remainder was dried at 120° C. to give a powder.

(3) Two or three droplets of a standard refractive index solution a refractive index of which has been known are dropped on a glass plate and mixed with the above powder.

(4) The above operation (3) was repeated using various standard refractive index solutions, and when the mixture becomes transparent, the refractive index of the standard refractive index solution is regarded as a refractive index of the fine particles.

Preparation of Transparent Film-Forming Coating Liquid (H)

50 g of a liquid containing a transparent film-forming component ($SiO_2$ concentration: 5% by weight) was prepared in the same manner as in Example 1.

The resulting liquid was mixed with 30 g of the silica-alumina particle (C) dispersion having a $SiO_2.Al_2O_3$ concentration of 5% by weight, and then, to the mixture was added a mixed solvent of ethanol/butanol/diacetone alcohol/isopropanol (mixing ratio of 2:1:1:5 by weight) to prepare a transparent film-forming coating liquid (H) having a $SiO_2.Al_2O_3$ concentration of 2.5% by weight.

Preparation of Substrate (H) with Transparent Film

A substrate (H) with a transparent film was obtained in the same manner as in Example 1, except that the transparent film-forming coating liquid (H) was used instead of the transparent film-forming coating liquid (A).

The resulting substrate (H) with a transparent film was measured on haze, anti-glare properties, bottom reflectance, luminous reflectance, scratch strength, pencil hardness and adhesion. The results are set forth in Table 1.

Example 9

Preparation of Substrate (I) with Transparent Film

A substrate (I) with a transparent film was obtained in the same manner as in Example 7, except that a transparent film-forming coating liquid (H) obtained in the same manner as in Example 8 was used instead of the transparent film-forming coating liquid (C).

The resulting substrate (I) with a transparent film was measured on surface resistance, haze, anti-glare properties, bottom reflectance, luminous reflectance, scratch strength, pencil hardness and adhesion. The results are set forth in Table 1.

Comparative Example 1

Preparation of Silica Particle (RA) Dispersion (Non-Linked Particles)

A silica particle (RA) dispersion having a $SiO_2$ concentration of 5% by weight that was obtainable during the course of the preparation of the silica particle (A) dispersion in Example 1 was prepared in the same manner as in Example 1.

Preparation of Transparent Film-Forming Coating Liquid (RA)

280 g of a liquid containing a transparent film-forming component ($SiO_2$ concentration: 5% by weight) was prepared in the same manner as in Example 1. The resulting liquid was mixed with 56 g of the silica particle (RA) dispersion having a $SiO_2$ concentration of 5% by weight, and then, to the mixture was added a mixed solvent of ethanol/butanol/diacetone alcohol/isopropanol (mixing ratio of 2:1:1:5 by weight) to prepare a transparent film-forming coating liquid (RA) having a $SiO_2$ concentration of 1% by weight.

Preparation of Substrate (RA) with Transparent Film

A substrate (RA) with a transparent film was obtained in the same manner as in Example 1, except that the transparent film-forming coating liquid (RA) was used.

The resulting substrate (RA) with a transparent film was measured on haze, anti-glare properties, bottom reflectance, luminous reflectance, scratch strength, pencil hardness and adhesion. The results are set forth in Table 1.

Comparative Example 2

Preparation of Transparent Film-Forming Coating Liquid (RB)

A transparent film-forming coating liquid (RB) having a $SiO_2$ concentration of 1% by weight was prepared in the same manner as in Example 3, except that a silica particle (RA, non-linked particle) dispersion obtained in the same manner as in Example 1 was used instead of the silica particle (A) dispersion.

Preparation of Substrate (RB) with Transparent Film

A substrate (RB) with a transparent film was obtained in the same manner as in Example 3, except that the transparent film-forming coating liquid (RB) was used.

The resulting substrate (RB) with a transparent film was measured on haze, anti-glare properties, bottom reflectance, luminous reflectance, scratch strength, pencil hardness and adhesion. The results are set forth in Table 1.

Comparative Example 3

Preparation of Silica-Alumina Particle (RC) Dispersion

The silica-alumina particle dispersion (RC, non-linked particles) obtained during the course of the preparation of the silica-alumina particle (C) dispersion was adjusted to have a $SiO_2.Al_2O_3$ concentration of 5% by weight in the same manner as in Example 8.

The $Al_2O_3/SiO_2$ ratio (by mol) of the silica-alumina particles (RC) was 0.0019, and the refractive index thereof was 1.28.

Preparation of Transparent Film-Forming Coating Liquid (RC)

50 g of a liquid containing a transparent film-forming component of $SiO_2$ (concentration: 5% by weight) was prepared in the same manner as in Example 3. The resulting liquid was mixed with 30 g of the silica-alumina particle (RC) dispersion (concentration: 5% by weight), and then, to the mixture was added a mixed solvent of ethanol/butanol/diacetone alcohol/isopropanol (mixing ratio of 2:1:1:5 by weight) to prepare a transparent film-forming coating liquid (RC) having a solids concentration of 1% by weight.

Preparation of Substrate (RC) with Transparent Film

A substrate (RC) with a transparent film was obtained in the same manner as in Example 1, except that the transparent film-forming coating liquid (RC) was used.

The resulting substrate (RC) with a transparent film was measured on haze, anti-glare properties, bottom reflectance, luminous reflectance, scratch strength, pencil hardness and adhesion. The results are set forth in Table 1.

Comparative Example 4

Preparation of Substrate (RD) with Transparent Film

With maintaining a surface of a panel glass (14") for a cathode-ray tube at 40° C., a transparent conductive fine particle layer-forming coating liquid (E) obtained in the same manner as in Example 5 was applied to the surface by a spinner method under the conditions of 150 rpm and 90 seconds and then dried. Subsequently, onto the resulting transparent conductive fine particle layer, a transparent film-forming coating liquid (RA) obtained in the same manner as in Comparative Example 1 was applied by a spinner method under the conditions of 150 rpm and 90 seconds similarly to the above, then dried and baked at 160° C. for 30 minutes to obtain a substrate (RD) with a transparent film.

The resulting substrate (RD) with a transparent film was measured on surface resistance, haze, anti-glare properties, bottom reflectance, luminous reflectance, scratch strength, pencil hardness and adhesion. The results are set forth in Table 1.

Comparative Example 5

Preparation of Substrate (RE) with Transparent Film

With maintaining a surface of a panel glass (14") for a cathode-ray tube at 40° C., a transparent film-forming coating liquid (RC) obtained in the same manner as in Comparative Example 3 was applied to the surface by a spinner method under the conditions of 100 rpm and 90 seconds, then dried and baked at 160° C. for 30 minutes to obtain a substrate (RE) with a transparent film.

The resulting substrate (RE) with a transparent film was measured on haze, anti-glare properties, bottom reflectance, luminous reflectance, scratch strength, pencil hardness and adhesion. The results are set forth in Table 1.

Comparative Example 6

Preparation of Substrate (RF) with Transparent Film

A substrate (RF) with a transparent film was obtained in the same manner as in Example 9, except that a transparent film-forming coating liquid (RC) obtained in the same manner as in Comparative Example 3 was used instead of the transparent film-forming coating liquid (H).

The resulting substrate (RF) with a transparent film was measured on surface resistance, haze, anti-glare properties, bottom reflectance, luminous reflectance, scratch strength, pencil hardness and adhesion. The results are set forth in Table 1.

TABLE 1

| | Transparent film-forming coating liquid | | | | | | | Transparent conductive Layer-forming coating liquid | | |
|---|---|---|---|---|---|---|---|---|---|---|
| | Coating liquid | | Inorganic oxide particle groups | | | Matrix-forming component | | Metal fine particles | | |
| No. | No. | Solids concentration (wt %) | Type (No.)* | Average particle diameter nm | Average number of linked particles, Length** | Solids concentration (wt %) | Type | Solids concentration (wt %) | No. | Type | Average particle diameter (nm) |
| Ex. 1 | A | 1 | $SiO_2$ (A) | 5 | 3 15 | 0.167 | $SiO_2$ | 0.833 | — | — | — |
| Ex. 2 | B | 1 | $SiO_2$ (A) | 5 | 3 15 | 0.375 | $SiO_2$ | 0.625 | — | — | — |
| Ex. 3 | C | 2.5 | $SiO_2$ (A) | 5 | 3 15 | 0.938 | $SiO_2$ | 1.563 | — | — | — |
| Ex. 4 | D | 2.5 | $SiO_2$ (B) | 5 | 6 30 | 0.938 | $SiO_2$ | 1.563 | — | — | — |
| Ex. 5 | A | 1 | $SiO_2$ (A) | 5 | 3 15 | 0.167 | $SiO_2$ | 0.833 | E | Ag/Pd | 8 |
| Ex. 6 | B | 1 | $SiO_2$ (A) | 5 | 3 15 | 0.375 | $SiO_2$ | 0.625 | E | Ag/Pd | 8 |
| Ex. 7 | C | 2.5 | $SiO_2$ (A) | 5 | 3 15 | 0.938 | $SiO_2$ | 1.563 | G | ITO | 20 |

TABLE 1-continued

| | | | | | | | | | | | |
|---|---|---|---|---|---|---|---|---|---|---|---|
| Ex. 8 | H | 2.5 | SiO$_2$.Al$_2$O$_3$ (C) | 40 | 3 120 | 0.938 | SiO$_2$ | 1.563 | — | — | — |
| Ex. 9 | H | 2.5 | SiO$_2$.Al$_2$O$_3$ (C) | 40 | 3 120 | 0.938 | SiO$_2$ | 1.563 | G | ITO | 20 |
| Comp. Ex. 1 | RA | 1 | SiO$_2$ (RA) | 5 | 1 | 0.167 | SiO$_2$ | 0.833 | — | — | — |
| Comp. Ex. 2 | RB | 1 | SiO$_2$ (RA) | 5 | 1 | 0.375 | SiO$_2$ | 0.625 | — | — | — |
| Comp. Ex. 3 | RC | 1 | SiO$_2$.Al$_2$O$_3$ (RC) | 40 | 1 | 0.375 | SiO$_2$ | 0.625 | — | — | — |
| Comp. Ex. 4 | RA | 1 | SiO$_2$ (RA) | 5 | 1 | 0.167 | SiO$_2$ | 0.833 | E | Ag/Pd | 8 |
| Comp. Ex. 5 | RC | 1 | SiO$_2$.Al$_2$O$_3$ (RC) | 40 | 1 | 0.375 | SiO$_2$ | 0.625 | — | — | — |
| Comp. Ex. 6 | RC | 1 | SiO$_2$.Al$_2$O$_3$ (RC) | 40 | 1 | 0.375 | SiO$_2$ | 0.625 | G | ITO | 20 |

| | Substrate with transparent film | | | | | | | | | |
|---|---|---|---|---|---|---|---|---|---|---|
| | Thickness of hard coating film μm | Thickness of conductive fine particle layer (nm) | Thickness of transparent film (nm) | Adhesion Number of residual squares | Scratch strength | Surface resistance Ω/□ | Bottom reflectance (%) | Luminous reflectance (%) | Haze | Pencil hardness | Gloss (%) |
| Ex. 1 | — | — | 120 | 100 | A | — | 1.8 | 2.2 | 0.2 | 7H | 75 |
| Ex. 2 | — | — | 120 | 100 | A | — | 1.7 | 2.2 | 0.2 | 7H | 70 |
| Ex. 3 | 5 | — | 120 | 100 | B | — | 1.65 | 2.0 | 0.2 | 4H | 70 |
| Ex. 4 | 5 | — | 120 | 100 | A | — | 1.65 | 2.0 | 0.3 | 5H | 65 |
| Ex. 5 | — | 40 | 80 | 100 | A | 800 | 0.2 | 0.8 | 0.1 | 8H | 75 |
| Ex. 6 | — | 40 | 80 | 100 | A | 850 | 0.2 | 0.8 | 0.1 | 8H | 72 |
| Ex. 7 | — | 120 | 90 | 100 | B | 1.2 × 10$^5$ | 0.8 | 1.4 | 0.2 | 4H | 70 |
| Ex. 8 | — | — | 120 | 100 | A | — | 1.0 | 1.3 | 0.2 | 6H | 75 |
| Ex. 9 | 5 | 120 | 90 | 100 | A | 1.2 × 10$^5$ | 0.1 | 0.8 | 0.3 | 4H | 70 |
| Comp. Ex. 1 | — | — | 120 | 100 | B | — | 1.8 | 2.2 | 0.1 | 5H | 85 |
| Comp. Ex. 2 | 5 | — | 120 | 83 | C | — | 1.65 | 2.0 | 0.1 | 2H | 82 |
| Comp. Ex. 3 | 5 | — | 120 | 82 | C | — | 1.65 | 2.0 | 0.1 | H | 80 |
| Comp. Ex. 4 | — | 40 | 80 | 100 | B | 850 | 0.2 | 0.8 | 0.1 | 4H | 80 |
| Comp. Ex. 5 | — | — | 120 | 100 | B | — | 1.4 | 1.8 | 0.1 | 4H | 82 |
| Comp. Ex. 6 | 5 | 120 | 90 | 80 | C | 1.3 × 10$^5$ | 0.4 | 1.1 | 0.2 | 2H | 80 |

*Lower part: sample number
**Lower part: length of chain of particles

The invention claimed is:

1. A transparent film-forming coating liquid comprising inorganic oxide particle groups, in each of which 2 to 10 inorganic oxide particles on an average are linked in the form of a chain, and a polar solvent,
wherein the inorganic oxide particles are porous particles and/or hollow particles each having a cavity inside, and
wherein the inorganic oxide particles are silica particles or silica-alumina particles.

2. The transparent film-forming coating liquid as claimed in claim 1, wherein the inorganic oxide particles have an average particle diameter of 4 to 200 nm.

3. The transparent film-forming coating liquid as claimed in claim 2, wherein the inorganic oxide particles are silica particles.

4. A substrate with a transparent film, comprising a substrate and a transparent film provided on the substrate, wherein the transparent film is formed by the use of the transparent film-forming coating liquid of claim 2.

5. The transparent film-forming coating liquid as claimed in claim 1, wherein the inorganic oxide particles are silica particles.

6. A substrate with a transparent film, comprising a substrate and a transparent film provided on the substrate, wherein the transparent film is formed by the use of the transparent film-forming coating liquid of claim 5.

7. A substrate with a transparent film, comprising a substrate and a transparent film provided on the substrate, wherein the transparent film is formed by the use of the transparent film-forming coating liquid of claim 1.

8. The substrate with a transparent film as claimed in claim 7, wherein a transparent conductive fine particle layer comprising conductive fine particles having an average particle diameter of 1 to 200 nm is provided between the substrate and the transparent film.

9. A display device having a front panel constituted of the substrate with a transparent film of claim 8, wherein the transparent film is formed on a surface of the front panel.

10. A display device having a front panel constituted of the substrate with a transparent film of claim 7, wherein the transparent film is formed on a surface of the front panel.

* * * * *

UNITED STATES PATENT AND TRADEMARK OFFICE
CERTIFICATE OF CORRECTION

| | |
|---|---|
| PATENT NO. | : 7,625,635 B2 |
| APPLICATION NO. | : 10/556375 |
| DATED | : December 1, 2009 |
| INVENTOR(S) | : Kumazawa et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this

Second Day of November, 2010

David J. Kappos
*Director of the United States Patent and Trademark Office*